March 8, 1949. B. E. LAWRENCE 2,463,781
PORTABLE SUNDIAL
Filed Dec. 30, 1946
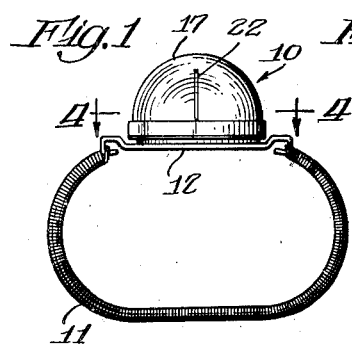
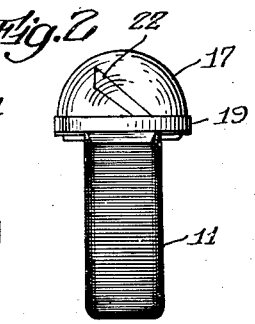
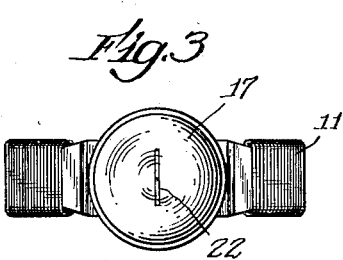
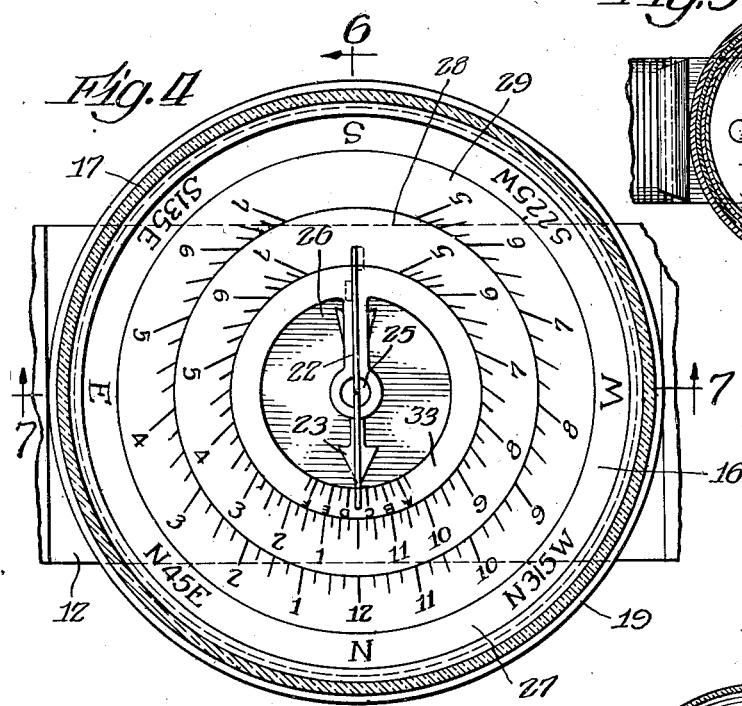
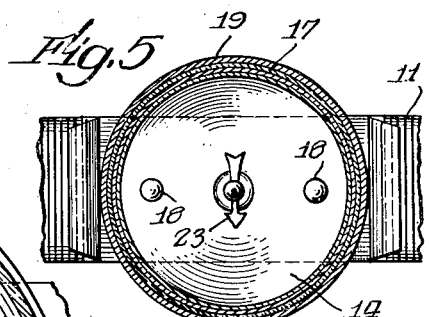
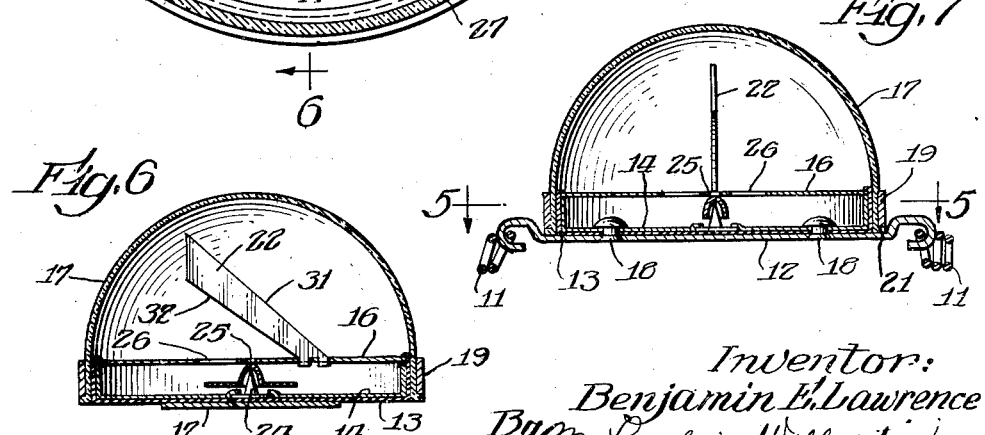
Inventor:
Benjamin E. Lawrence
By McLaughlin & Wallenstein
Attys Patented Mar. 8, 1949

2,463,781

UNITED STATES PATENT OFFICE 2,463,781

PORTABLE SUNDIAL

Benjamin E. Lawrence, Chicago, Ill.

Application December 30, 1946, Serial No. 719,189

1 Claim. (Cl. 33—62)

My invention relates to portable sun dials, and particularly to sun dials for attachment to the wrist in the general manner of a wrist watch.

There are a relatively large number of factors which must be considered to obtain accurate time readings on a sun dial. In general, a sun dial is relatively accurate only at one latitude regardless of whether it is of a portable or non-portable type. Portable sun dials, in the past, have utilized adjustable gnomons and/or adjustable dials to correct for changes in latitude depending upon the manner in which the shadow created by the sun dial was employed. If a sun dial be permanently mounted in position and properly orientated, a sun dial and gnomon may be so designed as to obtain reasonable accuracy, but even in such an installation inaccuracies will occur due to the so-called equation of time. Such a sun dial, however, will indicate local time, that is to say, the time at the exact point of installation, but will not accurately show standard time which is the average time for a particular zone. In the United States, for example, the central standard time zone extends across three or more States and the true local time might differ more than an hour in the most widely separated points of such zone. In portable sun dials, it is necessary at each reading to properly orientate the dial, and a common method is to employ a compass. Some means must also be provided for taking care of compass deviations.

The simplest form of sun dial is one in which a gnomon, the significant edge of which is set parallel to the earth's axis, is associated with a dial on which a shadow is cast and from which hours and fractions thereof can be read. When the dial is in a horizontal position, its calibrations are non-uniform except that the portion of the dial at opposite sides of 12:00 noon are identical. A dial may be supported in such a position that graduations on the dial are uniform but other complications are introduced by such arrangement. There are other principles for utilizing a shadow to determine time, all of which have been employed in sun dials, but for the purpose of making the problems and features of the present invention clear, I shall refer only to the type mentioned.

Portable sun dials of many types have been used and some suggested of a size which might be attached to the wrist. Changes in geographical location common to the user of such devices introduce problems requiring at least one and sometimes several adjustments depending upon the accuracy desired and the manner in which the designer sets about to obtain such accuracy. In a portable sun dial adapted for attachment to the wrist, it is desirable that a water-proof case be provided, an arrangement which is made very difficult when adjustable parts are employed. A device of the character identified should be simple enough to be used in a very brief period of time, not appreciably longer than required to determine the time by reference to an ordinary watch. So far as I know, no fully satisfactory portable sun dial of the type identified has been known, and certainly none which is small, water-proof, quickly used, and capable of adjustment with regard to such factors as compass deviations, differences in local and standard time and equation of time.

The principal object of my invention is the provision of an improved portable sun dial of the type identified.

A further object is the provision of a relatively very inexpensive, portable sun dial which avoids the problems and inaccuracies such as those identified hereinabove.

In general, I obtain the objects of my invention by providing a plural part gnomon capable of casting a shadow pattern from which time in various latitudes can be determined with a suitable dial. Generally concentrically arranged with respect to each other and properly positioned with respect to the gnomon, I provide a plurality of dials so designed that when properly orientated they will indicate local time when associated with the portion of the shadow pattern with which they are adapted to be used. To facilitate proper orientation of the dials, I provide a compass needle with which is associated a plurality of arbitrarily arranged graduations immovably associated with the sun dial graduations. The compass needle can, therefore, be made to point to the proper arbitrarily placed graduation by suitably rotating the entire device and when properly positioned in this manner, as will be explained, a highly accurate time reading may be taken. To determine the particular arbitrarily disposed graduation which is to be employed at any given time, the user of the sun dial of my invention consults a watch, either his own or that of another, in the same way in which a watch is ordinarily consulted for the purpose of setting the hands of another watch, and he then rotates the dial while holding it in a horizontal position until the gnomon's shadow indicates the known time on the sun dial. Holding the sun dial at this position, he notes the arbitrary graduation at which the compass needle is pointed. He then has the proper setting for that particular locality and time of year. Thereafter, to obtain the correct time, it is necessary only to adjust the compass needle to the predetermined graduation and the gnomon's shadow will then indicate the correct time within a very small margin of error. By this arrangement, I make simultaneous corrections for compass deviation, equation of time and the difference between local and standard time.

In the drawing, I show one embodiment of my invention in which—

Fig. 1 is an elevational view showing the sun dial with a band associated therewith for attachment to the wrist in the usual manner of a wrist watch;

Fig. 2 is a side elevational view of Fig. 1;

Fig. 3 is a plan view;

Fig. 4 is an enlarged plan sectional view taken on the line 4—4 of Fig. 1 looking in the direction of the arrows;

Fig. 5 is a transverse plan sectional view taken on the line 5—5 of Fig. 7;

Fig. 6 is a sectional view taken on the line 6—6 of Fig. 4; and

Fig. 7 is a sectional view taken on the line 7—7 of Fig. 4.

The embodiment of the invention shown in the drawings comprises a sun dial device 10 to which a flexible band 11 is attached. The sun dial device itself comprises a water-proof casing having a base plate 12, an exterior cup shaped casing 13, an interior cup shaped casing 14, a dial plate 16 and a dome shaped transparent closure member 17. It will be noted by reference to Fig. 7, that the dial plate 16 rests on the top edge of the cup shaped case member 14 and the case member 13 is spun or suitably formed to engage over the top edge of the dial plate and hold the dial plate and casing together as a unitary structure. The two nested cup shaped case members 13 and 14 are suitably secured to the base plate 12 as by rivets 18. The dome shaped transparent closure member 17 fits down tightly around the exterior of the cup shaped member 13 and a band 19 frictionally holds it in position to provide a seal and also pinches down against an annular edge extension 21 of the closure member 17 whereby to seal the joint between the band 19 of the base plate 12. The base plate 12 is furnished to provide a pair of attaching hook-like extensions for engaging the flexible band in the manner illustrated in Fig. 7. The dial plate 16 functions to support a gnomon 22. It is also suitably finished to provide a number of dials on its top face, as appears from Fig. 4.

Within the case, a compass needle 23 is supported on a pivot pin 24 mounted centrally of the casing as, for example, in the manner indicated in Figs. 6 and 7. The pin 24 has a hard relatively sharp point extending into a cup shaped portion of the needle 23 to form a free pivot and to prevent displacing of the needle. The dial plate 16 is apertured at 25 to provide a slight recess into which the cup shaped portion of the needle can project and be supported when the instrument is inverted so that regardless of the nature or violence of movement of the instrument the needle will always return to a free pivoting position when the dial face is horizontal and the gnomon uppermost. A larger aperture 26 permits the position of the compass needle to be readily observed. The dial plate may have a scale 27 for association with the compass needle to show direction as in the usual surveyor's compass, but this scale is not functionally associated with the sun dial.

The dial plate also has two time scales 28 and 29 having the characteristics of usual sun dial scales and adapted for use with a particular portion of a shadow pattern as will be explained. The gnomon 22 has a top edge 31 and a bottom elge 32 having a non-parallel relationship to each other so that the shadow cast by the gnomon will have two non-parallel sides. This produces a shadow pattern two portions of which are available for utilization in the determination of time but those skilled in the art will understand that other types of patterns may be employed such, for example, as a pattern to show three distinguishing lines which can be associated with suitable sun dial scales. The edges 31 and 32 are made to coincide with the elevation of the earth's celestial pole at two different longitudes. Assume, for example, that one corresponds generally to a position near southern Michigan and the other to a position near southern Missouri (keeping in mind that any desired values can be given to the lines 31 and 32), then by relating the shadow cast by the line 31 to the scale 29 (all other factors being properly taken care of) correct time can be shown in the more northerly point; while if the shadow of the line 32 is associated with the scale 28, then the correct time can be determined for the more southerly point.

Near the pointer end of the compass needle, I provide a time setting dial 33 provided with arbitrarily placed graduations using, for example, the letters "a" to "f," inclusive, as shown in the drawing. It will be noted that I have placed a letter on every other graduate line but each of the lines may be identified or any suitable means provided sufficient to be able to identify it from time to time as may be required.

To use the device of my invention, it is only necessary to know in approximately what part of the country the user finds himself and to "set" the sun dial by reference to a watch or other source of time in the same manner that an ordinary wrist watch is set.

Disregarding for a moment the geographical element which will determine which scale and which portion of the shadow pattern are employed, the user of the device inquires the time and then holding the dial plate horizontal and in such position that the sun can strike the gnomon, he rotates the entire device until the gnomon's shadow indicates the correct time. He then checks the position of the compass needles 23 and determines to which graduation on the dial 33 the needle points. So long as he remains in the same general vicinity and until the season of the year changes considerably he will again obtain the correct time by rotating the device until the compass needle points to the same graduation on the dial 33 to which the device had previously been set, and the correct time can then be determined by reference to the gnomon's shadow. By the use of the corrective dial 33, I automatically make an exact correction for compass deviation and an approximate but substantially complete correction for differences between local and standard time and equation of time. Those skilled in the art will understand that a sun dial usually shows only local time, although, a dial can be graduated in any arbitrary characters of which, obviously, arbitrarily designated time values can be one. Merely changing the numerical values assigned to graduations on a standard time scale, will not, however, solve the problem of correcting for differences between standard and local time. To explain, let us assume a difference of one hour in local time and the established time, and a correction for such difference by merely changing the number assigned to the graduations of a standard scale. Such a corrected sun dial would be correct for only the arbitary time designations established, and only so long as it remains in the same geographical location. By the use of my invention, I may make corrections for differences between local and standard time throughout a time zone, and while some errors are introduced by this method, the errors are still not nearly so great as those which would occur if other expedients were employed.

No simple sun dial, so far as I know, has been capable of making a correction for equation of time. Some complicated sun dials with several moving parts, or comprising several sun dials associated together have provided for correction of equation of time, but such sun dials are not suitable for use in a portable device such as that to which my invention relates. Because of the change in the position of the sun with respect to the equator, a sun dial which is absolutely correct for one season of the year may be off ten or fifteen minutes at another season of the year. This is an error due only to the changed position of the sun and not brought about by any other factor. Since the change due to the equation of time occurs relatively slowly, the device of my invention may be used in such a way as to eliminate the problem of equation of time merely by resetting it at relatively frequent intervals.

Still an additional source of error is introduced when a sun dial is moved in a north or south direction to a point different from that for which it was designed. A sun dial which would be absolutely correct from the standpoint of design in the northern part of the United States would give a false reading in the southern part of the United States. I adjust for this situation by the use of a gnomon such as disclosed in which the shadow patern will afford more than one line for cooperation with a suitable scale arrangement. In the embodiment shown, as previously explained, the edge 31 casts a shadow which can be used in the northern part of the United States by reference to the dial 29; while the edge 32 can be used in the southern part of the United States when associated with the dial 28. All that is necessary, therefore, to obtain a substantially accurate reading (and by that I mean in which the margin of error is not substantially greater in most instances than with the usual inexpensive wrist watch) is to set the device in the manner described to correct for compass deviation, differences between local time and standard time and equation of time and thereafter determine the time with the same setting by whatever portion of the gnomon's pattern the geographical location indicates should be utilized. For at least a substantial period of time (on the order of several weeks in summer and winter, but less in spring and fall), the correct time will always be obtained so long as the user remains in the same general vicinity. It is clear, of course, that mechanical accuracy of parts and assembly is necessary to obtain the desired functional accuracy. The gnomon must be accurate and attached accurately to the dial plate. The mechanical arrangement shown is such as to promote accuracy and also maintain a sealed case preventing ingress of water or dirt, either of which would be objectionable.

The features and scope of my invention are disclosed in the claim.

What I claim as new and desire to protect by Letters Patent of the United States:

In a sun dial device of the character described, a dial plate having a plurality of dials for different latitudinal positions and a gnomon associated with the dial plate shaped to cast a shadow pattern having a portion adapted for association with each of said dials, whereby the said sun dial device is adapted for use in more than one latitudinal position without adjustment of the gnomon or dial, said gnomon comprising a slanting upstanding figure with two nonparallel sides, which sides are parallel to the earth's axis at two different latitudinal positions.

BENJAMIN E. LAWRENCE.

REFERENCES CITED

The following references are of record in the file of this patent:

UNITED STATES PATENTS

| Number | Name | Date |
|---|---|---|
| 106,735 | Smith | Aug. 23, 1870 |
| 1,621,661 | Frank | Mar. 22, 1927 |
| 2,137,519 | Wigdor | Nov. 22, 1938 |